Feb. 20, 1945.  G. T. DOWNEY  2,370,021
ELECTRICALLY OPERATED CUTOFF VALVE
Filed Nov. 5, 1943  3 Sheets-Sheet 1
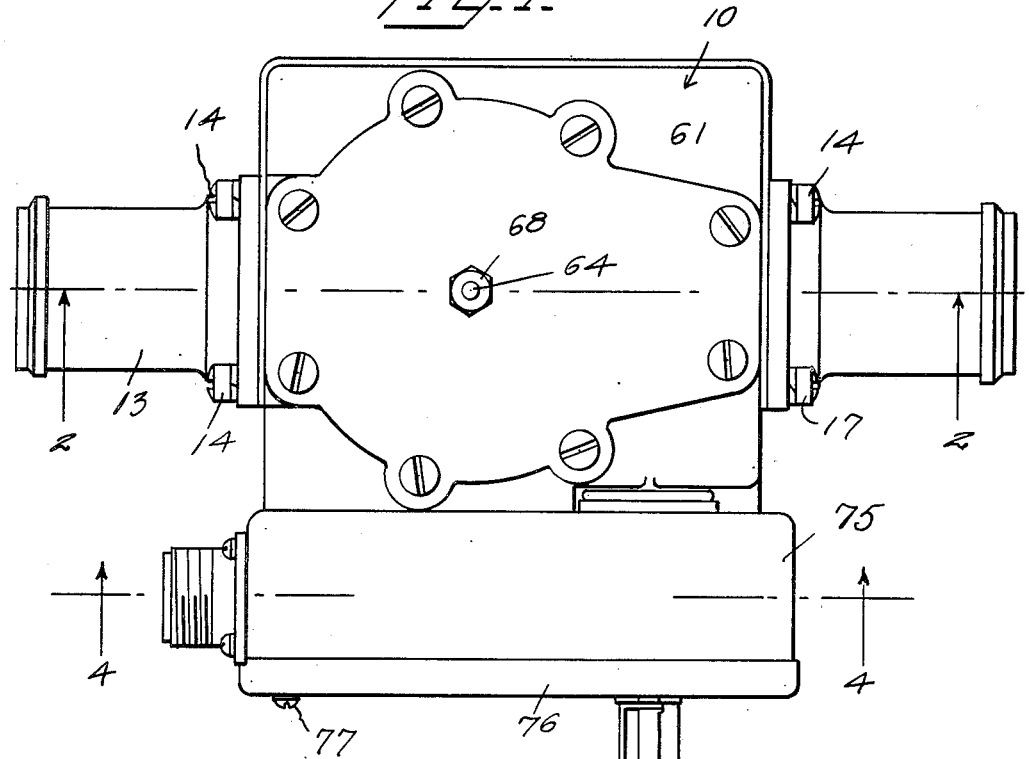
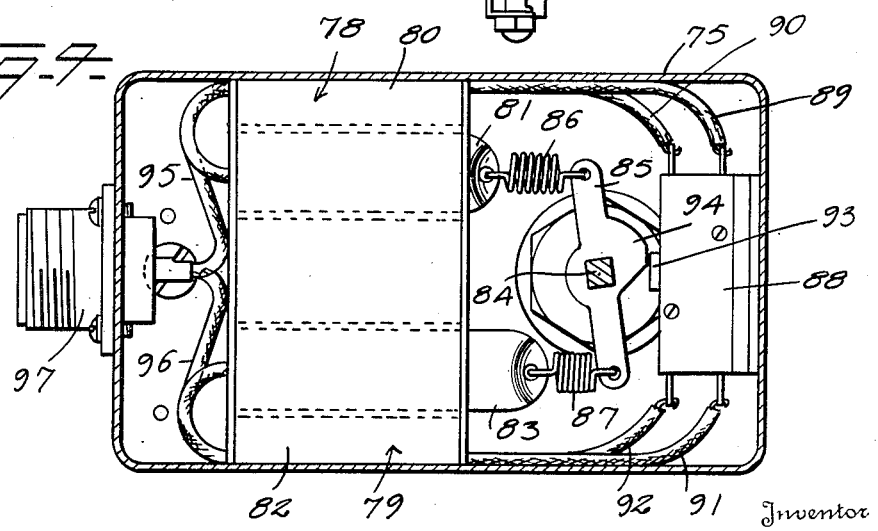
Inventor
G. T. Downey
By Kimmel & Crowell
Attorneys

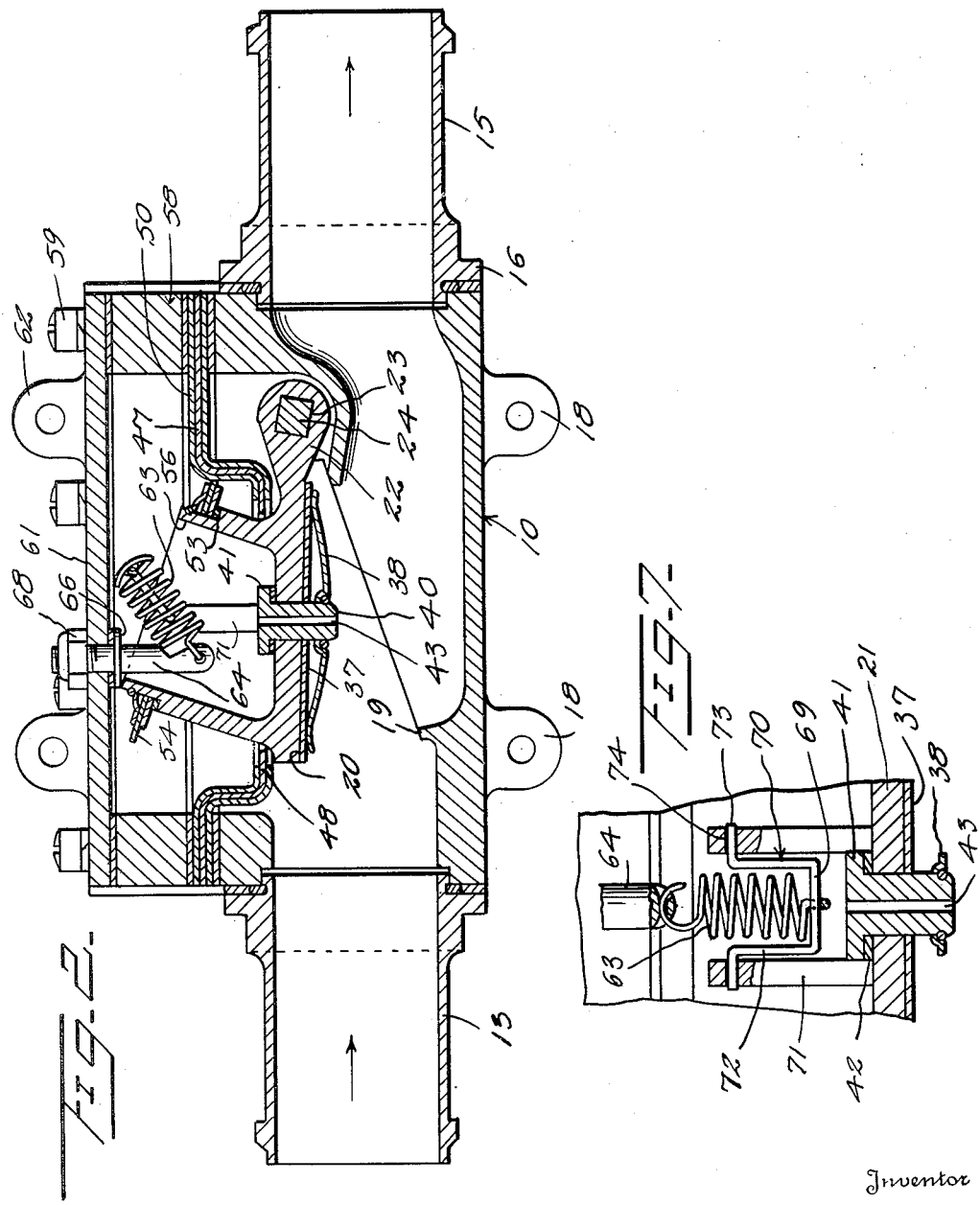

Feb. 20, 1945.                G. T. DOWNEY                2,370,021
                    ELECTRICALLY OPERATED CUTOFF VALVE
             Filed Nov. 5, 1943              3 Sheets-Sheet 3
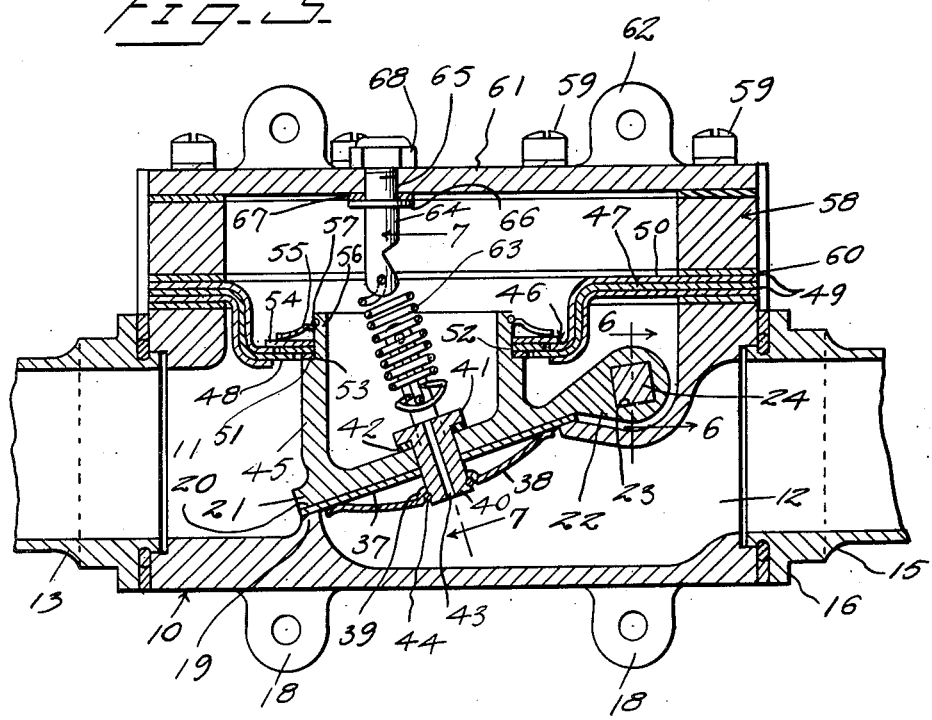
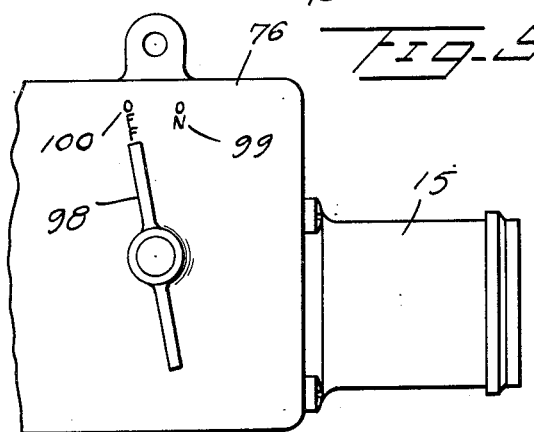
Inventor
G. T. Downey
By Kimmel & Crowell
Attorneys Patented Feb. 20, 1945

2,370,021

UNITED STATES PATENT OFFICE 2,370,021

ELECTRICALLY OPERATED CUTOFF VALVE

George T. Downey, Corry, Pa., assignor to Aero Supply Mfg. Co. Inc., Corry, Pa.

Application November 5, 1943, Serial No. 509,106

4 Claims. (Cl. 137—139)

This invention relates to an improved cutoff valve and an electric operator therefor.

An object of this invention is to provide an improved cutoff valve embodying a pivoted valve member incorporating a double seal and a spring for holding the valve member in either open or closed position.

Another object of this invention is to provide in a pivoted cutoff valve, an electric operator therefor which includes one solenoid for moving the valve member to open position and a second solenoid for moving the valve member to closed position.

A further object of this invention is to provide in a pivoted valve a pair of solenoids for moving the valve member to either open or closed position, and a cushioning spring between the core of each solenoid and the valve member so as to cushion the movement of the valve member and eliminate undue strain on the solenoid.

With the foregoing objects and others which may hereinafter appear, the invention consists of the novel construction, combination and arrangement of parts as will be more specifically referred to and illustrated in the accompanying drawings wherein are shown embodiments of the invention, but it is to be understood that changes, modifications and variations may be resorted to which fall within the scope of the invention as claimed.

In the drawings:

Figure 1 is a top plan of an electrically operated cutoff valve constructed according to an embodiment of this invention, Figure 2 is a sectional view taken on the line 2—2 of Figure 1, showing the valve in open position.

Figure 3 is a view similar to Figure 2, showing the valve in closed position,

Figure 4 is a sectional view taken on the line 4—4 of Figure 1,

Figure 5 is a fragmentary side elevation of the solenoid side of the valve,

Figure 6 is a fragmentary sectional view taken on the line 6—6 of Figure 3, and

Figure 7 is a fragmentary sectional view taken on the line 7—7 of Figure 3.

Referring to the drawings, the numeral 10 designates generally a valve housing having an intake port 11 at one end thereof and an outlet port 12 at the opposite end. A connector in the form of a flanged nipple 13 is secured to the intake end of the housing 10 by fastening members 14 to the intake end of the housing 10 and an outlet connector 15 having a flange 16 is secured by fastening members 17 to the outlet end of the housing 10. The housing 10 is provided with a pair of apertured ears 18 by means of which the housing may be secured to the desired supporting structure.

The housing 10 has formed on the interior thereof an inclined valve seat 19. A valve member generally designated as 20 is rockably mounted in the housing 10 and is adapted, when in closed position, to engage on the seat 19. The valve member 20 includes a plate 21 having secured thereto an arm 22 which is formed with a polygonal opening 23 through which the polygonal portion 24 of a rock shaft is adapted to engage. The rock shaft generally designated as 25 is formed with a reduced stub 26 which is journaled in an opening 27 formed in a wall of the housing 10.

The shaft 25 extends through a gland 28 threaded into a side wall 29 of the housing and a sealing member 30 is interposed between the outer head of the gland 28 and the outer side of the housing 10. A spring 31 is disposed about the shaft 25 bearing at its outer end against a washer 32 which is disposed in a bore or socket 33 formed in the gland 28. An outer sealing washer 34 is interposed between the outer side of the washer 32 and the inner end of the socket or bore 33. The inner end of the spring 31 bears against a washer 35 disposed about the shaft 25 and a pin 36 is extended through the shaft 25 and limits the inward movement of the washer 35.

The plate 20 has mounted on the inner face thereof a sealing gasket 37 which is held tightly against the inner face of the plate 21 by means of a cup-shaped clamping member 38. The clamping member 38 is provided with a centrally disposed detent 39 and is mounted on a pin 40 extending through the plate 21. The pin 40 is formed with a flange 41 and a gasket or washer 42 is interposed between the flange 41 and the outer side of the plate 21. The pin 40 is provided with a centrally disposed bleed opening 43 which provides communication between the outlet side of the valve housing and the upper side of the plate 21.

The clamping plate 38 is removably held on the pin 40 by means of a split locking ring 44 which is mounted on the pin 40 adjacent the inner end thereof and engages in the detent 39. The plate or valve member 21 has formed integrally therewith an annular flange 45 which extends outwardly from the plate 21 and is of a diameter substantially smaller than the diameter of the plate 21. An auxiliary valve seat, generally designated as 46, is carried by the housing 10 and includes a plate 47 which is formed with an inwardly offset seat portion 48. The plate 47 is provided with inner and outer resilient coverings 49 and 50 so that the plate 47 may be firmly sealed with respect to the housing 10.

The flange 45 is formed adjacent the outer portion thereof with an annular shoulder 51, and an annular valve washer 52 is mounted on the flange 45, there being a gasket or washer 53 interposed between the washer 52 and the shoulder 51. The washer 53 is adapted to be disposed in substantial alignment with the seat 48 when the valve 20 is in a closed position, and at this time the valve washer 52 which constitutes a second valve member is seated on the seat 48. A washer 54 engages the outer side of the valve member 52 and is held tightly thereagainst by means of a dished washer 55 which is locked on the reduced outer portion 56 of the flange 45 by means of a split locking ring 57.

The valve housing 10 includes an auxiliary housing 58 secured by fastening members 59 to the housing 10 and which is secured to the plate 47. A gasket 60 is interposed between the inner side of the housing 58 and the outer covering 50. The housing 58 also includes an outer wall 61 through which the fastening members 59 engage and the wall 61 is provided with a pair of apertured ears 62 correlated with the ears 18 by means of which the valve structure may be secured to the desired supporting structure.

The valve member 21 is yieldably held in either open or closed position by means of a spring 63. The spring 63 has the outer end thereof mounted on an inwardly projecting pin 64 which projects through an opening 65 formed in the wall 61. The pin 64 has secured thereto within the housing 58 a washer 66, and a sealing washer 67 is interposed between the washer 66 and the inner side of the wall 61. A nut 68 is threaded onto the outer projecting end of the pin 64. The spring 63 has the inner end thereof secured to the bight 69 of a rockable U-shaped member 70.

The plate 21 on the outer side thereof and within the flange 45 has secured thereto a pair of outwardly projecting bars 71 disposed on opposite sides of the flange 41 of the pin 40, as shown in Figure 7, and the parallel legs 72 of the U-shaped member 70 are provided with outwardly extending pins or trunnions 73 which rockably engage in openings 74 provided in the bars 71. The spring 63 is an expansion spring and the trunnions 73 are disposed laterally of the longitudinal axis of the pin 64 so that the spring 63 will readily hold the valve member 20 in either open or closed position.

The valve member 20 is adapted to be rocked to either open or closed position by an electrical operating means mounted in a housing 75 disposed at one side of the housing 10. The housing 75 includes a cap or removable wall 76 secured by fastening members 77. The housing 75 has mounted therein a pair of solenoids 78 and 79. The solenoid 78 constitutes the valve closing solenoid whereas the solenoid 79 constitutes the valve opening solenoid. The solenoid 78 includes an electro-magnetic coil 80 having slidable therein a core 81. The solenoid 79 includes an electromagnetic coil 82 having slidable therein a core 83. The shaft 25 at its outer end is provided with a square or polygonal portion 84 on which a bar 85 extends on opposite sides of the squared portion 84 of the shaft 25, and one end of the bar 85 is connected by means of a spring 86 to the core 81. The opposite end of the bar 85 is connected by means of a spring 87 to the core 83. A switch 88 is mounted within the housing 75 and constitutes a multiple pole switch having conductors 89 and 90 connected to a pair of poles of the switch and to the coil 80.

A second pair of conductors 91 and 92 are connected to another pair of the poles of the switch 88 and to the coil 82. The switch 88 includes a spring-pressed operator 93 projecting inwardly from the switch 88 into the housing 75 in a position for engagement with a cam 94 which is carried by the bar 85. The operator 93 is adapted in one position thereof, such as the position shown in Figure 4, to close an electric circuit through the conductors 91 and 92 to the coil 82. The switch 88 is connected by conductors 95 and 96 to a connector or coupling member 97. The conductor 95 is adapted to be interposed in an electric circuit having a switch for connecting the switch 88 with the source of electric supply and the conductor 96 is adapted to be connected to a second switch for connecting the switch 88 with the source of electric supply so that the valve member 20 cannot have the electric operator energized to move the valve member to either open or closed position, unless the switch 88 is in the proper position. In other words, with the valve member 20 in a closed position, which in the position shown in Figure 3, and in which position the valve member 20 was moved by inward movement of the core 81 of the solenoid 78, it will not be possible to energize the coil 80 of the solenoid 78 again until the valve member 20 has been moved to an open position. This arrangement will eliminate or prevent undue energizing of a solenoid and prevent burning thereof.

In order that the position of the valve member 20 can be readily determined, I have provided an indicating arm or pointer 98 which is mounted on the shaft 25 outwardly of the housing 75. The outer side of the cap 76 is provided with spaced indicia 99 and 100 indicating the on and off position of the valve member.

In the use and operation of this valve structure. the connecting nipples 13 and 15 may be connected to the desired pipe or conduit, the fluid flowing from left to right as viewed in Figure 2. With the valve member 20 in open position the indicator 98 will be in alignment with the indication 99. In order to move the valve 20 to a closed position, the solenoid 78 is energized thereby causing the core 81 to be drawn into the interior of the coil 80 and as the core 81 moves inwardly of the coil 80, the spring 86 will resiliently resist pull on the bar 85, thereby effecting a cushioning of the movement of the valve member 20 and also permitting the core 81 to not only tension the spring 86, but also to initially move inwardly of the coil 80 without movement of the bar 85 and the valve member 20.

This cushioning movement of the valve member 20 will provide a quicker action in opening or closing of the valve member and will prevent burning of the coils of the solenoids. As the bar 85 is rocked counterclockwise, the spring-pressed switch operator 93 will move to the position shown in Figure 4, breaking the circuit to the conductors 89 and 90 and closing the circuit to the conductors 91 and 92. Thereafter the switch correlated with the conductors 89 and 90 may be left in a closed position, but as the switch 88 has broken the circuit to the coil 80, this coil will not be energized.

The valve member may be moved to an open position by closing the switch interposed in the conductors 91 and 92, whereupon the core 83 will move inwardly of the coil 82. When the bar 85 is rocked clockwise as viewed in Figure 4, the cam 94 will press the switch operator 93 inwardly of the switch structure 88 and thus break the electric circuit to the conductors 91 and 92 and at the same time the circuit will be closed to the conductors 89 and 90.

The provision of the bleed passage 43 through the valve member 20 will provide for the smooth movement of the valve member to either open or closed position, the size of the bleed passage 43 determining the speed of movement of the valve member 20 to either open or closed position. In other words, when the valve member 20 is rocked to an open position, the fluid either liquid, gas or air in the housing 58 will be under compression and this compression will gradually be released through the bleed passage 43.

When the valve member 20 is moved to closed position there will be formed a partial vacuum or suction in the housing 58 which will gradually be relieved by entrance of fluid through the bleed passage 43. Spring 63 will be compressed during the rocking of the valve member 20 to either open or closed position and will maintain the valve member 20 in either open or closed position.

What I claim is:

1. An electrically operated valve comprising a housing, a main valve seat in said housing, a main valve member engageable on said seat, a chamber spaced from said valve seat, an auxiliary vale seat in said housing spaced from said main seat and between the latter and said chamber, an auxiliary valve member carried by said main valve member engageable on said auxiliary seat when said main valve member is in closed position, electro-magnetic means for moving said valve members to open or closed position, and bleed means carried by said main valve member communicating said chamber with the outlet side of said main valve seat when said main valve member is in closed position.

2. An electrically operated valve as set forth in claim 1 including a yieldable connection between said electro-magnetic means and said main valve member.

3. An electrically operated valve as set forth in claim 1 wherein said electro-magnetic means includes a pair of solenoids, a core slidable in each solenoid, and a spring connecting each core with said main valve member.

4. An electrically operated valve comprising a valve housing, a valve seat in said housing, a valve member engageable on said seat, a rock shaft pivotally supporting said valve member, an arm secured to said shaft, an electro-magnetic operator connected to said arm for rocking said shaft to valve closing position, a second electro-magnetic operator connected to said arm for rocking said shaft to valve opening position, yieldable means for holding said valve member in either open or closed position, a laterally disposed chamber carried by said housing, an annular flange carried by said valve member movable into said chamber, an auxiliary valve seat carried by said housing, and an auxiliary valve member carried by said flange engageable on said auxiliary seat when said first valve member is in closed position.

GEORGE T. DOWNEY.